United States Patent [19]

Redlich

[11] 4,194,094

[45] Mar. 18, 1980

[54] DEVICE FOR MECHANICALLY RECORDING A SIGNAL HAVING A BANDWIDTH OF SEVERAL MHz, PARTICULARLY FOR A VIDEO DISC

[75] Inventor: Horst Redlich, Berlin, Fed. Rep. of Germany

[73] Assignee: Ted Bildplatten Aktiengesellschaft AEG-Telefunken-Teldec, Switzerland

[21] Appl. No.: 962,645

[22] Filed: Nov. 21, 1978

[30] Foreign Application Priority Data

Nov. 22, 1978 [DE] Fed. Rep. of Germany ....... 2752022

[51] Int. Cl.² .................... G11B 3/46; H01L 41/10; H01L 23/14
[52] U.S. Cl. ............... 179/100.41 P; 179/100.4 C; 310/326; 310/328; 358/128
[58] Field of Search ............... 179/100.4 C, 100.41 J, 179/100.41 P, 100.41 R; 310/326, 327, 328, 345; 358/128

[56] References Cited

U.S. PATENT DOCUMENTS

| Re. 29,113 | 1/1977 | Halter | 179/100.41 P |
|---|---|---|---|
| 3,805,100 | 4/1974 | Klemp et al. | 179/100.4 C |
| 3,824,352 | 7/1974 | Adler et al. | 179/100.41 P |
| 3,976,830 | 8/1976 | Glenn | 179/100.4 C |

*Primary Examiner*—Bernard Konick
*Assistant Examiner*—Donald McElheny Jr.
*Attorney, Agent, or Firm*—McGlew and Tuttle

[57] ABSTRACT

A device for mechanically recording a signal having a bandwidth of several MHz on a receiving surface, particularly on a video disc, comprises, a rigid housing having a stylus receiving cavity with a piezoelectric transducer mounted in said cavity which is adapted to oscillate backwardly and forwardly. A cutting stylus is connected to the transducer and projects out of the housing cavity for cutting the receiving surface. Damping means are disposed between the transducer and the housing in the cavity and provide a greater resilience for movement of the transducer in the direction of oscillation than in a direction perpendicular thereto.

12 Claims, 1 Drawing Figure

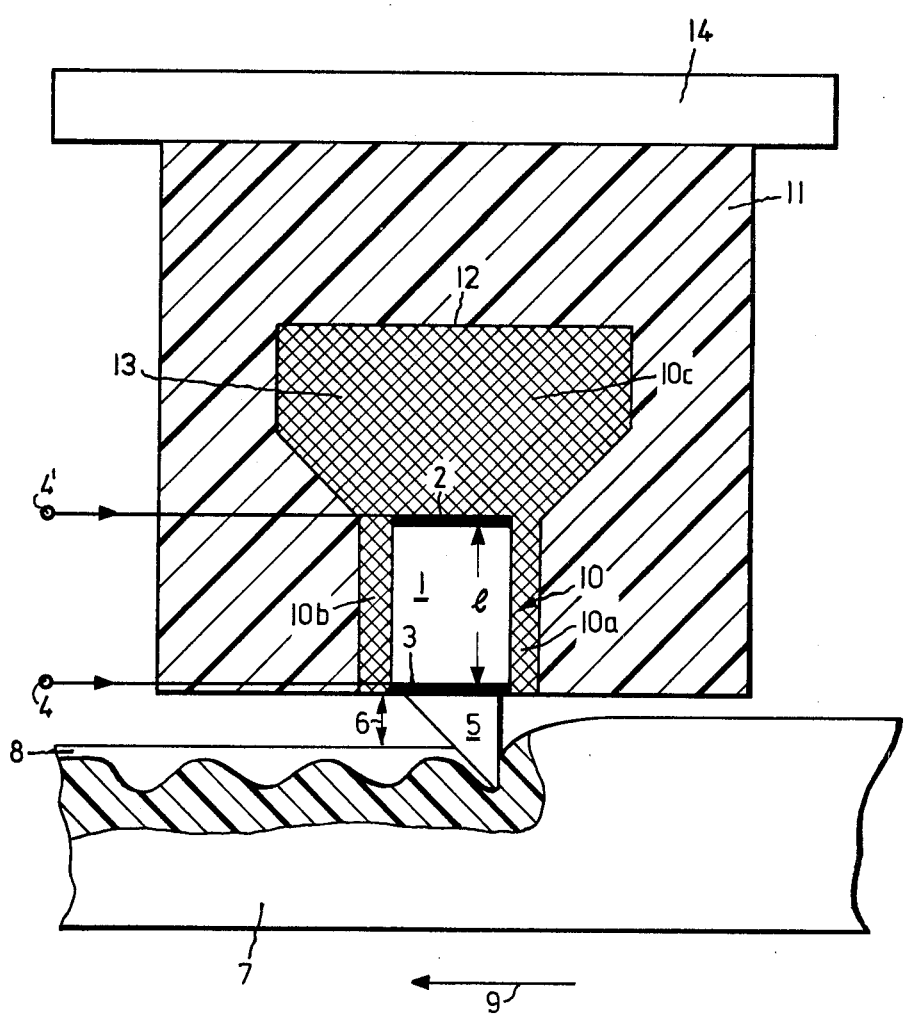

DEVICE FOR MECHANICALLY RECORDING A SIGNAL HAVING A BANDWIDTH OF SEVERAL MHz, PARTICULARLY FOR A VIDEO DISC

FIELD AND BACKGROUND OF THE INVENTION

This invention relates to the construction of recording devices in general and, in particular, to a new and useful device for mechanically recording a signal having a bandwidth of several MHz, particularly for a video disc.

DESCRIPTION OF THE PRIOR ART

In order to record a wideband signal having a bandwidth of several MHz, particularly a video signal on a video disc, it is known from German Pat. No. 1,574,489 to record the signal in the form of a frequency-modulated carrier mechanically on a disc along a spiral track and to pick it up in accordance with the so-called pressure pickup method. With such a mechanical recording, the cutting stylus itself must execute mechanical oscillations of several MHz. This cannot be readily done, however, because of the inertia of the cutting stylus.

It is further known to read the video signal into a temporary storage, particularly to record it on a film, in order to pick it up at a reduced speed and record it mechanically on a disc at that speed which is, for example, reduced by the factor 25. However, such a temporary storage is an additional expenditure and, in addition, the time required for cutting is thereby multiplied. It has therefore been sought to increase, as far as possible, the upper frequency limit at which the stylus is able to cut.

In a recorder of the prior art, known from German Pat. No. 2,203,095, the electromechanical transducer comprises an extensional-mode oscillator of an amorphous piezoelectric oxide having a high coupling factor of about 0.6 and more and made of a mixture of metal oxides, particularly lead oxide, zirconium oxide and titanium oxide. The transducer is designed with dimensions such that its natural frequency is slightly higher than the highest frequency to be recorded and the ohmic resistance of the electrical circuit is dimensioned to keep the resonance rise, due to the natural resonance of the transducer, sufficiently small. Bounds are set to a further increase of the natural frequency and, thereby, to the upper frequency limit by the fact that the mechanical dimensions of the transducer become still smaller, so that the electric energy supplied can then no longer be converted into the desired mechanical deflection of the cutting stylus in a satisfactory manner.

Another possibility for extending the frequency range upwardly is to provide the natural frequency of the transducer within the operational frequency range and to use means for reducing the disturbing influence of the natural frequency. This may be obtained particularly with mechanical or electrical damping means.

In such devices, the transducer must be mounted in a special manner to enable it to execute the oscillations desired for the cutting of the signal without hindrance. At the same time, the mounting of the transducer is determinative for the mechanical properties, such as frequency response and resonance properties. An optimal solution would be to support the transducer in its zero point of motion. This point, however, is located in the interior of the transducer and is inaccessible for mounting.

German Pat. No. 2,203,095 shows an oscillatory system comprising a transducer and a cutting stylus which is supported on its end faces by means of resilient springs.

It is further known from German patent disclosure AS No. 2,331,538 to connect the cutting stylus rigidly to a base part which is, in turn, rigidly connected to the transducer. In order to eliminate the resonances, specially shaped connecting members are provided between the cutting stylus and the transducer, as well as between the transducer and the support of the system. These members have a plurality of free outer surfaces which do not extend parallel to each other.

Such transducer mountings have the disadvantage of giving rise to reflections caused by the relatively rigid securing of the oscillatory system, which lead to partial resonances. In consequence, considerable attenuations or accentuations in the frequency response of the transducer occur, i.e., in the dependence of the mechanical cutting amplitude of the stylus on the constant-amplitude frequency of the signal controlling the transducer.

SUMMARY OF THE INVENTION

The present invention is directed to a transducer mounting by which the reflections and irregularities in the frequency response are reduced.

In accordance with the invention, there is provided a device for mechanically recording a signal having a bandwidth of several MHz onto a receiving surface, such as a video disc surface. The apparatus includes a rigid housing which has a stylus-receiving cavity with a piezoelectric transducer mounted in the cavity. A cutting stylus is connected to the transducer and projects out of the housing for cutting into a disc which is moved thereby. The construction includes a damping material disposed between the transducer and the walls of the housing inside the cavity such that there is a greater resilience for movement of the transducer in the direction of oscillations than in directions perpendicular thereto. This is accomplished by having a damping material of a greater thickness in the cavity between the housing and the rear wall of the transducer and having damping material of a much lesser thickness on each side of the transducer.

Thus, in accordance with the invention, a firm mounting of the transducer has been abandoned and replaced by a sort of floating transducer mounting. However, this floating mounting is strongly differentiated as to its resilience in the direction of the transducer oscillations and in the track direction, i.e., in the direction in which the stylus cuts the track in the record support. This differentiation is dimensioned to absorb the tangential forces caused by the material removal during the cutting operation and acting in the track direction, parallel to the plane of the disc. On the contrary, in its direction of oscillation, that is, with a hill-and-dale recording, perpendicularly to the disc surface, the mounting of the transducer is sufficiently resilient to obtain the desired motion of the transducer which is necessary for the cutting operation.

Accordingly, an object of the invention is to provide a device for mechanically recording a signal having a bandwidth of several MHz on a receiving surface, such as a video disc, which comprises, a rigid housing which has a stylus-receiving cavity therein with a piezoelectric transducer mounted in the cavity and oscillating backwardly and forwardly and connected to a cutting stylus which projects out of the cavity for cutting the receiving surface and which further includes damping means disposed in the cavity between the transducer and the housing providing a greater resilience for movement of the transducer in the direction of oscillation than in a direction perpendicular thereto.

A further object of the invention is to provide a device for mechanically recording a signal having a bandwidth of several MHz, particularly for a video disc which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a transverse, sectional view of a device for mechanically recording a signal on a video disc, constructed in accordance with the present invention.

DESCRIPTION OF THE PREFERRED EMBODIMENT

Referring to the drawing in particular, the invention embodied therein, comprises, a device for mechanically recording a signal having a bandwidth of several MHz on a receiving surface, such as a video disc 7. The drawing shows a piezoelectric oscillation transducer 1 which is provided with respective conducting silver films 2 and 3 on both end faces. A carrier frequency, modulated with the video signal, is applied to these films through terminals 4 and 4'. Due to the signal voltage effective between films 2 and 3, the length 1 of transducer 1 between the films varies, so that a cutting stylus 5 connected to transducer 1 performs an oscillatory motion in directions indicated by the double arrow 6. In this way, a track 8 with alternating elevations and depressions is cut in a video disc 7.

In accordance with German Pat. No. 1,547,064, the cut is so deep that material is removed even above the elevations of track 8 and is thus removed over the entire extension of the surface of video disc 7 and a smooth surface is thereby obtained. During the cutting operation, video disc 7 is moved past cutting stylus 5 in the direction of the arrow 9. In practice, the depth of the cut relative to the thickness of the video disc is substantially smaller than that shown. The thickness of the disc is about 0.1 mm while the depth of the groove is 1 μm.

Transducer 1 is embedded in a body 10 which is made of a damping material and, in turn, is surrounded by a substantially rigid housing 11. Housing 11 is secured to a system support 14 by which, during the cutting, housing 11, along with the parts 10, 1 and 5, is moved in the radial direction of rotating video disc 7 to produce a spiral track. Body 10 is made of a fluoroelastomer known under the trademark VITON and having a hardness of about 60–95 Shore A, a tearing strength above 141 kg/cm$^2$, and a temperature range of −40° C. to +315° C. The housing 11 is made of a hard tissue or a ceramic material.

Operation

During the cutting, due to the motion of video disc 7 in the direction 9, cutting stylus 5 is stressed in the direction 9, thus tangentially to disc 7. Since the material of body 10 between transducer 1 and housing 11, at the left and right sides of transducer 1, forms relatively thin walls 10a and 10b, a relatively rigid mounting is obtained in this direction.

Thus, in practice, and as desired, transducer 1 suffers no excursion in the direction 9 within housing 11. Such an excursion is undesirable since it would lead to deformation of the groove cut in video disc 7. However, in the directions of oscillation 6, the resilience of body 10 is substantially greater due to the larger material thickness of wall portion 10c of the body 10 in the zone 13 between conducting silver film 2 and the edge 12 of housing 11. For example, with the increasing length of transducer 1 due to the signal at terminals 4, 4', cutting stylus 5 moves downwardly in the direction 6 and plunges farther into the material of video disc 7.

This motion benefits the cutting operation as a working motion. At the same time, due to the resilience of the material of body 10 between film 2 and edge 12, the upper portion of transducer 1 moves upwardly, so that oscillations are produced in the zone 13. These oscillations are damped because of the damping effect of the material in zone 13. Reflections which would lead to disturbing resonances are thereby avoided to the greatest possible extent. Since transducer 1 can expand in both directions, it acts as a half-wave oscillator.

While a specific embodiment of the invention has been shown and described in detail to illustrate the application of the principles of the invention, it will be understood that the invention may be embodied otherwise without departing from such principles.

What is claimed is:

1. A device for mechanically recording a signal, having a bandwidth of several MHz on a receiving surface, particularly on a video disc, comprising, a rigid housing having a stylus-receiving cavity, a piezoelectric transducer mounted in said cavity, a cutting stylus connected to said transducer and projecting out of said housing for cutting into the receiving surface, and damping means disposed between said housing and said transducer for resiliently supporting said transducer in said cavity and providing a greater resilience for movement of said transducer in the direction of oscillation than in a direction perpendicular thereto.

2. A device for mechanically recording a signal, as claimed in claim 1, wherein said damping means on each side of said transducer holds said transducer sufficiently rigid so as to prevent any force of reaction acting thereon by the contact of said cutting stylus with the receiving surface.

3. A device for mechanically recording a signal, as claimed in claim 1, wherein said damping means comprises a resilient material disposed in said cavity between said housing and said transducer on each of two sides and on its inner end thereof, said damping material being thicker between the inner end of said transducer and said housing and being thinner on each side thereof, said housing being substantially rigid on each side so that the transducer is held against any reaction by said stylus on the receiving surface for permitting greater movement of said transducer in the direction of oscillation thereof.

4. A device for mechanically recording a signal, as claimed in claim 3, wherein said cutting stylus is connected to said transducer on an end thereof which faces out of the cavity of said housing, said damping means comprising a resilient material disposed on each side of said transducer and between the inner end of said transducer and said housing.

5. A device for mechanically recording a signal, as claimed in claim 4, wherein said damping material widens conically from each side of said transducer in a direction away from the cutting stylus.

6. A device for mechanically recording a signal, as claimed in claim 5, wherein said cutting stylus extends outwardly from said housing, each end of said transducer having a silver film conductor.

7. A device for mechanically recording a signal, as claimed in claim 1, wherein said damping means includes a resilient material having a hardness in the order of magnitude of from 60 to 95 Shore A.

8. A device for mechanically recording a signal, as claimed in claim 1, wherein said damping means comprises a material having a tearing strength of more than 141 kg/cm$^2$.

9. A device for mechanically recording a signal, as claimed in claim 1, wherein said damping means comprising a material having a temperature range of from −40° C. to +315° C.

10. A device for mechanically recording a signal, as claimed in claim 1, wherein said damping means comprises a fluoroelastomer material.

11. A device for mechanically recording a signal, as claimed in claim 1, wherein said damping means comprises a material made up of a plurality of parts of unequal dimensions.

12. A device for mechanically recording a signal, as claimed in claim 1, wherein said housing comprises a hard tissue or ceramic material.

* * * * *